United States Patent
Siegel et al.

(10) Patent No.: US 7,682,534 B2
(45) Date of Patent: Mar. 23, 2010

(54) METHOD FOR THE PRODUCTION OF A CARBON OR CERAMIC COMPONENT

(75) Inventors: Stefan Siegel, Dresden (DE); Gottfried Boden, Dresden (DE); Uwe Petasch, Panschwitz (DE); Volker Thole, Braunschweig (DE); Roland Weiss, Hüttenberg (DE); Thorsten Scheibel, Bad Nauheim (DE); Martin Henrich, Wetzlar (DE); Marco Ebert, Wetter (DE); Martin Kühn, Heuchelheim (DE); Andreas Lauer, Kirchhain (DE); Gotthard Nauditt, Linden (DE)

(73) Assignees: Schunk Kohlenstofftechnik GmbH, Heuchelheim (DE); Fraunhofer-Gesellschaft zur Forderung der Angewandten Forschung E.V., Munich (DE)

( * ) Notice: Subject to any disclaimer, the term of this patent is extended or adjusted under 35 U.S.C. 154(b) by 1124 days.

(21) Appl. No.: 10/498,005

(22) PCT Filed: Dec. 12, 2002

(86) PCT No.: PCT/EP02/14152

§ 371 (c)(1),
(2), (4) Date: Feb. 22, 2005

(87) PCT Pub. No.: WO03/050058

PCT Pub. Date: Jun. 19, 2003

(65) Prior Publication Data

US 2005/0151305 A1 Jul. 14, 2005

(30) Foreign Application Priority Data

Dec. 12, 2001 (DE) ................. 101 61 108

(51) Int. Cl.
*B29C 67/20* (2006.01)
(52) U.S. Cl. .......... 264/29.6; 264/29.7; 264/662
(58) Field of Classification Search ........... 264/29.1, 264/29.6, 29.7; 501/88
See application file for complete search history.

(56) References Cited

U.S. PATENT DOCUMENTS

| 6,673,279 B2 * | 1/2004 | Gardner ............. 264/29.6 |
| 6,793,873 B2 * | 9/2004 | Gadow et al. ........ 264/646 |
| 7,238,308 B2 * | 7/2007 | Rosenloecher ......... 264/29.1 |
| 2002/0151428 A1 | 10/2002 | Horiuchi et al. |

FOREIGN PATENT DOCUMENTS

| DE | 3922539 | 1/1991 |
| DE | 19823507 | 12/1999 |
| DE | 19947731 | 4/2001 |
| GB | 1346735 | 2/1974 |
| JP | 02026817 | 1/1990 |
| JP | 2001048648 | 2/1991 |
| WO | 0164602 | 9/2001 |

OTHER PUBLICATIONS

Iizuka et al—"Mechanical Properties of Woodceramics: A Porous Carbon Material"—Journal of Porous materials . . . , May 1999, pp. 175-184.
Greil—"Biomorphous Ceramics From Lignocellulosics", Journal of the European Ceramic society . . . , Feb. 2001, pp. 105-118.
Schmidt et al "Microstructure and Properties of Biomorphic SiSiC Ceramics Derived from Pyrolysed Wooden Templates, . . . " Wiley-Vch, 2001, pp. 414-419.
Hoffmann et al "Biomorphic SiSiC Ceramic Composites from Pre-processed Biological Fibers, . . . " Wiley-Vch, 2001, pp. 407-413.
Wikipedia "Mitteldichte Holzfaserplatten" pp. 1-7.

* cited by examiner

*Primary Examiner*—Carlos Lopez
(74) *Attorney, Agent, or Firm*—Dennison, Schultz & MacDonald

(57) ABSTRACT

A method for the production of a carbon or a ceramic component based on carbon, using a cellulose-containing semi-finished molded piece which is pyrolyzed. According to the invention, homogeneous large-size ceramic components may be produced, whereby a cellulose-containing, semi-finished molded piece containing fibers, chips or strands of homogeneous density distribution and homogeneous structure is used as semi-finished molded piece and is pyrolyzed in non-oxidizing gas atmospheres.

29 Claims, No Drawings

METHOD FOR THE PRODUCTION OF A CARBON OR CERAMIC COMPONENT

This application is a filing under 35 USC 371 of PCT/EP2002/014152 filed Dec. 12, 2002.

The invention relates to a method for producing a carbon or ceramic component based on carbon, using a cellulose-containing, especially lignocellulose-containing semi-finished molded piece, which is pyrolyzed in a non-oxidizing gas atmosphere.

Ceramic components having large surfaces, especially wall thicknesses between 0.2 and 20 mm, and consisting of carbon or silicon carbide are used e.g. as firing or sintering bases, as carrier and charging systems or as lightweight components in furnaces and heat exchangers. The use of carbon materials e.g. in furnace construction has proven useful especially due to their low density, sufficient resistance and good stability at high temperatures of over 2000° C. in a non-oxidizing atmosphere. If even higher resistance and stiffness requirements have to be met, silicon carbide materials are used.

In the production of large carbon components and articles various powder technology methods can be employed. To this end, carbon and/or graphite powder is mixed with a binder agent having a high carbon content, such as pitch, resin or cellulose-containing solutions, pressed into molds and cured through thermal treatment. If necessary, another mechanical and chemical final treatment step can be performed to harden the surface. The disadvantage of this technology, which is preferably employed for the production of large carbon items with thin walls, is above all the high equipment-related complexity that is required to produce good and reproducible powder and binder agent quality. Moreover the scrap rate is relatively high, contributing to the high manufacturing costs.

In the manufacture of large carbon products also carbon-fiber reinforced carbon (CFC) materials are used. To produce these, carbon fibers in form of fleece, mats or fabrics are saturated in part several times with resins such as phenol resins and are subsequently pyrolyzed. These materials combine the properties of polycrystalline carbon with the benefits of high-strength carbon fibers and represent composites that exhibit high stability, high tear resistance, high thermal shock resistance, low density and good mechanical forming abilities (M. Leuchs, J. Spörer: "Langfaserverstärkte Keramik—eine neue Werkstoffklasse (Long-Fiber Reinforced Ceramics—A New Material Category)", Keram. Zeitschrift (Ceramics Magazine) 49, 18-22 (1997). Due to the high manufacturing costs, however, a comprehensive use is not given.

DE 198 23 507 relates to a method for producing shaped bodies on the basis of carbon, carbides and/or carbonitrides. In doing so, biogenic materials are used, which are converted into a product mainly containing carbon by carbonization and are subsequently processed to obtain shaped bodies with a high carbon content. As biogenic starting materials fiber composites in form of fleece, mats or fabrics, i.e. long-fiber composites, as well as large thin-walled surface structures are suggested here. In their use as carbon materials with a mechanical function, corresponding technical surface structures are subject to significant restrictions since the achievable carbon density is too low for most applications so that the resistance values do not meet the requirements of the mechanically highly stressed components. Such a product can also be used as a carbon platen for a reaction siliconization only to a limited extent since a high percentage of free silicon in the end product causes significant restrictions in the corrosion and high-temperature behavior.

The use of ligneous products as starting materials for inexpensive SiC ceramics, which are formed by means of a so-called "Biocarbon pre-mold" through liquid phase siliconization, is known from "Krenkel: Biomorphe SiC-Keramiken aus technischen Hölzern (Biomorphous SiC ceramics made of industrial woods)", "Composite Materials and Material Composites" Symposium, Editors K. Schulte, K. Kainer, Publishing House Wiley Chemie Weinheim 1999 as well as "Low cost ceramics from wooden products", Materials Week, Munich Sep. 23-Sep. 28, 2000". In experiments above all carbon bodies were siliconized from pyrolyzed veneer plywood and transferred into a C/SiC/Si material.

From DE 199 47 731 A1 we know of a method for producing a component made from SiC ceramics. To this end, a ceramic component is produced from a cellulose-containing starting body through pyrolysis and subsequent infiltration of silicon. The starting body consists of an industrial semi-finished product, which is made from cellulose-containing material in form of chips and/or individual layers of wooden sheets. In doing so, the structure of the semi-finished part is adjusted through various ratios of the cellulose-containing material and binder agent, wherein the binder agent content amounts to more than 5%. Based on the layer formation and the selection of the cellulose-containing material a semi-finished product is created that has a high percentage of translaminar pore channels, facilitating the infiltration of liquid silicon. In a layered semi-finished product, this process is enhanced further through the formation of cracks during pyrolysis. However, this inhomogeneous, heavily porous structure leads to a carbon platen that can be used for only very limited SiSiC special applications. The resulting high percentage of free Si in the end product limits both the mechanical properties and the corrosion and high-temperature behaviors significantly.

From JP 2001-048648 we know about producing a component on the basis of carbon using a lignocellulose-containing semi-finished formed part, which is pyrolyzed in the absence of oxygen. The formed carbon parts have a low mechanical stability.

WO 01/64602 relates to a ceramic component that has been produced on the basis of a lignocellulose-containing semi-finished molded part. The material composition and processing technology result in a low material density as well as structural and density inhomogeneities.

From DE 39 22 539 C2 we know of a method for producing high-precision heating elements out of carbon-fiber reinforced carbon (CFC), which suggests a pressed carbon fiber textile fabric or wound carbon monofilament fibers as the starting bodies. It is then possible to siliconize the pyrolyzed body.

A significant disadvantage of the method pursuant to the prior art is that the large products that have been produced with the powder technology or by means of a fiber winding operation are complex and expensive since special molding tools or fiber winding assemblies are required. Another disadvantage consists of the fact that structuring such as bores, recesses or the like, as is required for special application purposes, have to be either integrated into the molding tool at extremely high additional cost or must be inserted later on into the rigid and partially brittle fiber composite carbon product.

Carbon or SiC materials that are produced from chips or veneer plywood are inhomogeneous. Wood is characterized by a distinct anisotropy, which is also maintained in macroscopic wood elements such as chips or veneers. Even with a correspondingly adapted material forming process, the raw material-related anisotropy is transferred to the composite. Hence, mechanical and thermal properties of the material are highly anisotropic.

The present invention is based on the object of designing or further developing a method of the above-mentioned kind such that homogeneous large carbon or ceramic components can be manufactured as mass products, which exhibit largely isotropic mechanical and thermal properties. Also the methods should become more simplified. Finally, it should be possible to shape geometric structures in the components.

Pursuant to the invention the problem is substantially solved for one in that a sheet-shaped molded part having a density $\rho$ with $\rho \geq 500$ kg/m$^3$ and a homogeneous density distribution across its sheet diagonal line with a density deviation $\Delta\rho$ wherein $\Delta\rho \leq 20$ kg/m$^3$ is used as the semi-finished molded piece.

In particular the problem however is solved in that a sheet-shaped molded part consisting of cellulose-containing and/or lignocellulose-containing particles is used as the semi-finished molded part, wherein said particles are distributed from a statistical point of view in the molded piece such that the semi-finished molded part has isotropic or substantially isotropic properties, and in that the semi-finished molded piece is siliconized such after pyrolysis that the ceramic component is a SiSiC ceramic component with a desired free C portion with $C \geq 0\%$. The board that is used is especially a low density (LDF), medium density (MDF) or high density (HDF) board, wherein the LDF board has a density $\rho_L$ with $400 \leq \rho_L \leq 650$ kg/m$^3$, the MDF board has a density $\rho_M$ with $650 \leq \rho_M \leq 800$ kg/m$^3$, and the HDF board has a density $\rho_H$ with $800 \leq \rho_H \leq 1100$ kg/m$^3$. The idea pursuant to the invention can however also be implemented based on hard particle boards and extra hard particle boards.

The special advantage of the fiber-containing, lignocellulose-containing starting materials pursuant to the invention is in their high isotropy.

In particular the semi-finished molded piece consists of randomly, i.e. statistically dispersed, preferably polymer-bonded particles, which lead to isotropic properties of the molded body that is to be pyrolyzed. The particles can be fibers, but also flat particles, which in turn have the same or substantially the same extensions in the plane defined by the respective particle. The molded piece is hereby produced such that it is suited for a subsequent siliconization operation such that an SiSiC ceramic component with a defined free C portion can be produced.

It is preferred that a fiber board with a density of $650 \leq \rho \leq 1100$ kg/m$^3$ and homogeneous density distribution along the board diagonal line especially with $\Delta\rho \leq 10$ kg/m$^3$ is used as the semi-finished molded part.

Pyrolysis occurs especially in the absence of oxygen at a temperature T of $400°$ C.$\leq T \leq 2300°$ C., especially $T \leq 1600°$ C., wherein especially the heating speed in the temperature range between $250°$ C. and $550°$ C. is between 0.1 K/min and 0.5 K/min, especially between 0.3 and 0.5 K/min. Gaseous and volatile compounds arising in the reaction chamber should furthermore be removed with a current of a non-oxidizing gas or inert gas such as nitrogen or argon.

To produce large ceramic components made of carbon or silicon carbide especially lignocellulose-containing sheets comprising fibers, chips and/or strands should be used, wherein said sheets should have a thickness D with 1 mm$\leq D \leq 50$ mm and/or a density $\rho$ with $\rho \geq 500$ kg/m$^3$. The thickness D should preferably be 2 mm$\leq D \leq 20$ mm and/or the density $\rho \geq 650$ kg/m$^3$.

For producing a fiberboard as the semi-finished molded part, in particular a mixture of the binder agent and fibers is molded in a hot pressing operation. Using a hot press allows the selection of a considerably shorter pressing cycle than with a cold pressing operation, resulting in economical advantages. The desired structure and the desired pattern are hereby achieved by means of the degree of compaction and the selection of various pressing phases. The compaction process can consist of several opening and closing operations with subsequent holding phases, wherein at least a specific pressing force $P_1$, which is to be applied during the first compaction phase, should be: $P_1 \geq 5$ N/mm$^2$. In doing so, the plasticizing characteristic of wood when exposed to heat and steam is utilized. During the holding phase, the pressing operation should be maintained until the binder agent has cured. However the pressing force can be lowered by means of control systems in accordance with the plasticization level that has been reached. This way it is ensured that bonds formed among the fibers are not destroyed. It prevents cracks in the semi-finished molded piece and excludes damaging interference in the material continuum.

Accordingly produced plates are dimensionally stable and self-contained even at densities of less than 700 kg/m$^3$. Appropriate results can be achieved not only with fibers, but also with chips or strands. If instead of fibers strands with coefficients of fineness of more than 80 are used and if during fleece formation a directional orientation is foregone, board with an express isotropy are created.

For certain applications the certain level of anisotropy present in oriented strand board (OSB), parallel strand lumber (PSL), laminated strand lumber (LSL), veneered strand lumber (VSL) or uniform particle boards can be of benefit. Regardless thereof, however, the pressing operation should be conducted corresponding to that used for the production of the semi-finished molded pieces out of fiber pursuant to the invention.

Apart from the question whether the board as the semi-finished molded piece, especially when present in form of a fiberboard, has a flat extension in the range of preferably between 0.1 m$^2$ to 3 m$^2$, which is sufficient in most cases, it is provided in a particularly emphasized development of the invention that machining of the board occurs prior to its pyrolysis so as to achieve a desired structure in the finished component. Machining can hereby take place in a metal-cutting or non-cutting fashion. Also, especially during the pressing operation, desired shapes can be implemented. To this end it is also feasible that the machining and/or molding operation occurs simultaneously for several boards arranged on top of each other.

The machined—possibly also unmachined—boards as the semi-finished molded parts are then subjected to the pyrolysis process, wherein preferably temperatures between 400 and 2300° C., especially temperatures between 800 and 1600° C. in the absence of oxygen are used in order to convert the semi-finished molded parts into the carbon ceramics.

The material shrinkage associated with the pyrolysis process can be taken into consideration for the design of the final dimensions already on the starting semi-finished product. Hereby it must be considered that shrinkage in the length and width amounts to about 20 to 25% and in the height to about 30 to 40%. Due to the pyrolysis process the density of the semi-finished molded piece changes as well, to about 70 to 80% of the starting sheet thickness.

Shrinkage rates and density changes are overall dependent on the type of the board, on the material type, the type of wood, binder agent, the binder agent content, pyrolysis conditions and the geometric dimensions.

Moreover the idea pursuant to the invention provides that the pyrolysis of the board occurs such that arising volatile pyrolysis products such as water, carbon monoxide, carbon dioxide, aliphatic or aromatic hydrocarbons such as benzene, napthaline or alcohols, ketones, aldehydes can reach the exhaust gas without impairment. Correspondingly long pyrolysis times, which can certainly extend to several days in the temperature range between 250° C. and 550° C., as well as clearances between the boards are required if several boards are pyrolyzed at the same time. To simplify the degassing process, another suggestion of the invention provides that an additive is introduced into the semi-finished molded piece, which acts as a pore-forming agent when exposed to heat.

After the completed pyrolysis process the sheet, which now largely consists of carbon, is cooled under an inert gas atmosphere to room temperature, to avoid spontaneous ignition of the carbon parts. The products manufactured this way generally do not require further processing so that they form the desired components. For certain filigree components, however, subsequent mechanical processing operations can also still be performed.

Without leaving the idea of the invention, it is also feasible to chemically post-treat the corresponding ceramic components. This way oxidation-inhibiting layers such as silicon dioxide, silicon carbide or silicates can be applied. An infiltration of liquid or gaseous silicon is also possible, creating SiC or Si/SiC/C composites.

Preferably medium density fiber boards (MDF) having a density $\rho$ with 650 kg/m³ $\leq \rho \leq$ 800 kg/m³ and high density fiber boards (HDF) having a density $\rho$ with $\rho \geq$ 800 kg/m³ are used for forming homogeneous carbon board through pyrolysis in an inert gas flow. These fiber boards can comprise both wood fibers and plant fibers as the fiber material. Plant fibers that can be used include especially flax, hemp, sisal, miscanthus or nettle. Upon pyrolysis, densities between 600 and 700 kg/m³ are reached for MDP starting boards and 700 to 900 kg/m³ for HDF boards.

The corresponding ceramic components produced through pyrolysis are dimensionally stable, self-contained and easy to handle. They can be stacked without difficulty. Mechanical post-treatment and their installation into systems are also feasible. The bending strength of corresponding carbon components is between 20 and 50 MPa and that of silicon carbide components is up to 350 MPa. The boards produced this way have a good homogeneity in the mechanical properties such as density and stability, a prerequisite for the self-contained characteristic.

Boards produced with the idea of the invention can have any desired surface dimensions. Preferably surfaces of up to 3 m² should be mentioned, however larger surfaces can be achieved as well.

Carbon products manufactured pursuant to the invention can be used as linings for furnaces, in heat exchangers, as firing and sintering bases or as carrier and charging systems. Other applications are friction elements and systems, seals and lightweight assemblies. A use as substrate material and processing aids in solar technology should also be mentioned.

The carbon components can be manufactured inexpensively as mass products.

Moreover it shall be mentioned that it is also possible to convert the carbon components with silicon into SiC-containing composites by means of liquid phase or gaseous phase siliconization in order to use the SiC/C/Si products created this way likewise as carrier and charging systems, firing and sintering bases. A use in brakes, clutches, friction elements, filter elements, heating elements, protective shieldings and the like is also feasible.

Further details, benefits and features of the invention result not only from the claims, the features revealed therein— either alone and/or in combination—but also from the following examples containing more details.

EXAMPLE 1

A medium density fiber board (MDF) was produced by applying—in an experimental system, consisting of a boiling apparatus, blowline gluing system and a tubular dryer—a urea formaldehyde resin onto wood fibers having a length of 2 mm and residual moisture of 4%, subsequently pre-compressing them cold to a density of 150 kg/m³ and then hot-pressing them in accordance with a special pressing sequence at a temperature of 200° C. in order to increase density and cure the binder agent. The MDF board had a density of 800 kg/m³ and a thickness of 8 mm. From said MDF board a sheet section of 300×300 m² was cut and exposed to a pyrolysis process up to 1700° C. Pyrolysis took place in a box furnace with dry nitrogen at a flow speed of 15 l/min, wherein the volatile pyrolysis products such as methane, hydrogen, low hydrocarbons and carbon monoxide were burned in an afterburning system. Pyrolysis products that were less volatile such as higher aliphatic and aromatic hydrocarbons were separated in a separator filled with oil. The pyrolysis time took a total of 38 hours, wherein the heating speed in the area of maximum loss of mass was 30 Kh$^{-1}$.

The pyrolyzed fiber board consisted of 98.8% carbon and had a density of 630 kg/m³ and an open porosity of 57%. The shrinkage of the board was 23.2% in the length and width and 36.5% in the height. The decrease in mass over the starting fiber board amounted to 73.5%. The carbon board obtained this way had a dimension of 230×230×5.1 mm³, had no warpage, was completely level and was self-contained. Mechanical machining (boring, cutting, milling) was good without leading to partial breakage and chipping. The stability of samples taken from the carbon board with the dimensions 10×4.5×64 mm³ was 21±3 MPa, measured based on the 3-point bending method (platen 50 mm).

EXAMPLE 2

A high density fiber board (HDF) was produced analog to the way described in Example 1, wherein the temperature during hot pressing was 210° C. The HDF board had a density of 1000 kg/m³ and a thickness of 8 mm. From said HDF board a sheet section of 300×300 m² was cut and exposed to a pyrolysis process up to 1700° C. pursuant to Example 1. The pyrolyzed wood fiber board consisted of 99.1% carbon, had a density of 810 kg/m³ and an open porosity of 43%. The shrinkage of the board was 23.4% in the length and width and 35.8% in the height. The decrease in mass over the starting fiber board amounted to 70%.

The carbon board obtained this way had no warpage, was level and was self-contained and easy to machine without chipping. The stability of samples taken from the carbon board with the dimensions 10×4.5×64 mm³ was 33±3 MPa, measured based on the 3-point bending method (platen 50 mm).

From a parallel carbon sample of the same board a silicon carbide sample was produced by conducting a liquid siliconization process with a temperature of 1600° C. pursuant to the wick method. Said SiC sample had the same exterior dimensions as the carbon sample, had a density of 2.84 kg/m³ and no open porosity. The bending strength was 268±40 MPa, measured based on the 4-point bending method. The modulus of elasticity was 270±10 Gpa.

EXAMPLE 3

An oriented strand board (OSB) was produced by processing pine wood by means of a chipper into conventional OSB strands with a dimension of 60 to 150 mm long, 15 to 30 mm wide and 0.4 to 1 mm thick, the strands were glued with a polyphenyl methane diisocyanate resin, then cold pre-compressed and subsequently compressed at 200° C. The density of the OSB board was 650 kg/m$^3$. The thickness of the board was 18 mm. From said OSB board a sheet section of 300×300 m$^2$ was cut and exposed to a pyrolysis process up to 1700° C. pursuant to Example 1. The pyrolyzed OSB board consisted of 99.4% carbon and had a density of 480 kg/m$^3$. The board section had the dimensions 230×230×11.7 mm$^3$ after pyrolysis, had no warpage or breakage and was self-contained. It was easy to machine without chipping. The loss in mass of the carbon board obtained this way over the board section prior to pyrolysis amounted to 72%.

The invention claimed is:

1. Method for producing a ceramic component based on carbon, comprising the steps of:
    obtaining a cellulose-containing, semi-finished, sheet-shaped molded piece having a density ρ with ρ≧800 kg/m$^3$ and a homogeneous density distribution across its sheet diagonal line with a density deviation Δρ wherein Δρ≦20 kg/m$^3$,
    pyrolyzing the molded piece at a temperature T with 400° C.≦T≦2300° C. in a non-oxidizing gas atmosphere,
    to obtain a pyrolyzed component having a density of about 700 to 900 kg/m$^3$, and
    subjecting the pyrolyzed component to a siliconization operation to achieve an SiSiC ceramic body with a desired free C portion of close to 0%.

2. Method pursuant to claim 1, wherein the molded piece is a lignocellulose-containing semi-finished molded piece.

3. Method pursuant to claim 1, wherein the molded piece is a level or a three-dimensionally formed piece.

4. Method pursuant to claim 1, wherein a the molded piece is a polymer-bonded molded piece.

5. Method pursuant to claim 1, wherein the molded piece is a part having isotropic properties.

6. Method pursuant to claim 5, wherein the isotropic properties comprise a homogeneous density distribution across its sheet diagonal line with a density deviation Δρ wherein Δρ≦10 kg/m$^3$.

7. Method pursuant to claim 1, wherein the molded piece is a fiber, chip and/or strand-containing board.

8. Method pursuant to claim 1, wherein 800° C.≦T≦1600° C.

9. Method pursuant to claim 1, wherein the molded piece is heated in the temperature range of about 250° C. to about 550° C. at a rate of about 0.1 K/min to 0.5 K/min.

10. Method pursuant to claim 1, wherein gaseous volatile compounds released during pyrolysis are removed with an inert gas flow.

11. Method pursuant to claim 7, wherein the molded piece is a fiber board having a thickness D with 1 mm≦D≦50 mm.

12. Method pursuant to claim 7, wherein pore-forming additives are admixed in a starting mixture for the board.

13. Method pursuant to claim 1, wherein the molded piece is produced by hot pressing a mixture of lignocellulose-containing fibers and binder agent.

14. Method pursuant to claim 1, wherein the molded piece is produced through successive pressing steps.

15. Method pursuant to claim 1, wherein the molded piece is chemically post-treated upon pyrolysis and/or after post-machining.

16. Method pursuant to claim 1, wherein the pyrolyzed molded piece is provided with an oxidation-inhibiting layer.

17. Method pursuant to claim 1, wherein the siliconization is conducted at a temperature $T_2$ with $T_2$≦1420° C.

18. Method pursuant to claim 1, wherein the molded piece is produced from wood fibers and/or plant fibers.

19. Method pursuant to claim 1, wherein the molded piece comprises a high density (HDF) fiber board, which is optionally machined and/or formed to a desired extent.

20. Method pursuant to claim 1, wherein the molded piece is machined in a metal-cutting or non-cutting operation.

21. Method pursuant to claim 1, wherein the molded piece is a board that is free from or substantially free from binder agent.

22. Method pursuant to claim 1, wherein the molded piece is an oriented strand board (OSB), parallel strand lumber (PSL), laminated strand lumber (LSL), veneered strand lumber (VSL) board or a uniform particle board.

23. Method pursuant to claim 1, wherein the molded piece comprises strands having coefficients of fineness of >80.

24. Method pursuant to claim 1, wherein the molded piece is formed three-dimensionally before pyrolysis.

25. Method pursuant to claim 1, wherein bores, recesses or milled slots are incorporated into the molded piece prior to the pyrolysis, while observing shrinkage behavior of the semi-finished molded piece during pyrolysis.

26. Method pursuant to claim 1, wherein for the production of the semi-finished molded piece, fiber-shaped particles are obtained through pressure fusion, mechanical fusion, thermo-mechanical fusion or chemo-thermomechanical fusion.

27. Method pursuant to claim 1, wherein molded piece is obtained from a mixture comprising isocyanate-containing adhesives.

28. Method pursuant to claim 1, wherein the semi-finished molded piece is produced by suspending fibers in water, with subsequent sedimentation and pressing.

29. Method for producing a ceramic component based on carbon, comprising the steps of:
    obtaining a semi-finished molded piece produced from wood or plant fibers in the form of a fiber, chip or strand-containing board having a density ρ with ρ≧800 kg/m$^3$ and a homogeneous density distribution across its sheet diagonal line with a density deviation Δρ wherein Δρ≦20 kg/m$^3$;
    pyrolyzing the semi-finished molded piece at a temperature T with 400° C.≦T≦2300° C. in the absence of oxygen;
    removing gaseous volatile compounds released during the pyrolysis with an inert gas flow,
    to obtain a pyrolyzed component having a density of about 700 to 900 kg/m$^3$; and
    subjecting the pyrolyzed component to a siliconization operation to achieve an SiSiC ceramic body with a desired free C portion of close to 0%.

* * * * *